(12) United States Patent
Takemoto et al.

(10) Patent No.: US 8,643,239 B2
(45) Date of Patent: Feb. 4, 2014

(54) MOTOR

(75) Inventors: Yoshiaki Takemoto, Toyohashi (JP); Shigemasa Kato, Toyohashi (JP); Seiya Yokoyama, Toyohashi (JP); Keisuke Koide, Kosai (JP)

(73) Assignee: Asmo Co., Ltd. (JP)

( * ) Notice: Subject to any disclaimer, the term of this patent is extended or adjusted under 35 U.S.C. 154(b) by 379 days.

(21) Appl. No.: 13/185,081

(22) Filed: Jul. 18, 2011

(65) Prior Publication Data

US 2012/0019089 A1 Jan. 26, 2012

(30) Foreign Application Priority Data

Jul. 21, 2010 (JP) .................. 2010-164018
Oct. 7, 2010 (JP) .................. 2010-227825

(51) Int. Cl.
  *H02K 21/12* (2006.01)
  *H02K 1/06* (2006.01)

(52) U.S. Cl.
  USPC ............ 310/156.57; 310/156.45; 310/156.54; 310/216.064; 310/216.094

(58) Field of Classification Search
  USPC .......... 310/156.01–156.84, 216.064, 216.094
  See application file for complete search history.

(56) References Cited

U.S. PATENT DOCUMENTS

| | | | | |
|---|---|---|---|---|
| 5,508,576 | A * | 4/1996 | Nagate et al. | 310/156.54 |
| 6,597,079 | B2 * | 7/2003 | Miyashita et al. | 310/156.48 |
| 7,327,062 | B2 * | 2/2008 | Kaneko | 310/156.57 |
| 2011/0140562 | A1 | 6/2011 | Kato et al. | |
| 2011/0148240 | A1 | 6/2011 | Koide et al. | |

FOREIGN PATENT DOCUMENTS

JP 4-71342 A 3/1992

* cited by examiner

*Primary Examiner* — Tran Nguyen
*Assistant Examiner* — Leda Pham
(74) *Attorney, Agent, or Firm* — Schwegman, Lundberg & Woessner, P.A.

(57) ABSTRACT

A motor including a rotor and a stator. The rotor includes a rotor core, magnet pole portions, and core pole portions. First magnetic pole portions, which are the magnet pole portions or the core pole portions, each include a first and second opposing parts arranged in an axial direction. Each first opposing part includes an auxiliary groove, and each second opposing part does not include an auxiliary groove. Where M(°) represents an open angle of the first magnetic pole portion, G(°) represents an open angle of the void, and L represents the number of teeth, an angle D1 from a center line in the circumferential direction of the first magnetic pole portion to the side surface in the auxiliary groove that is closer to the center line in the circumferential direction satisfies $D1 = M/2 + G - a \times 360(°)/L$ (where $a$ is a natural number).

9 Claims, 13 Drawing Sheets

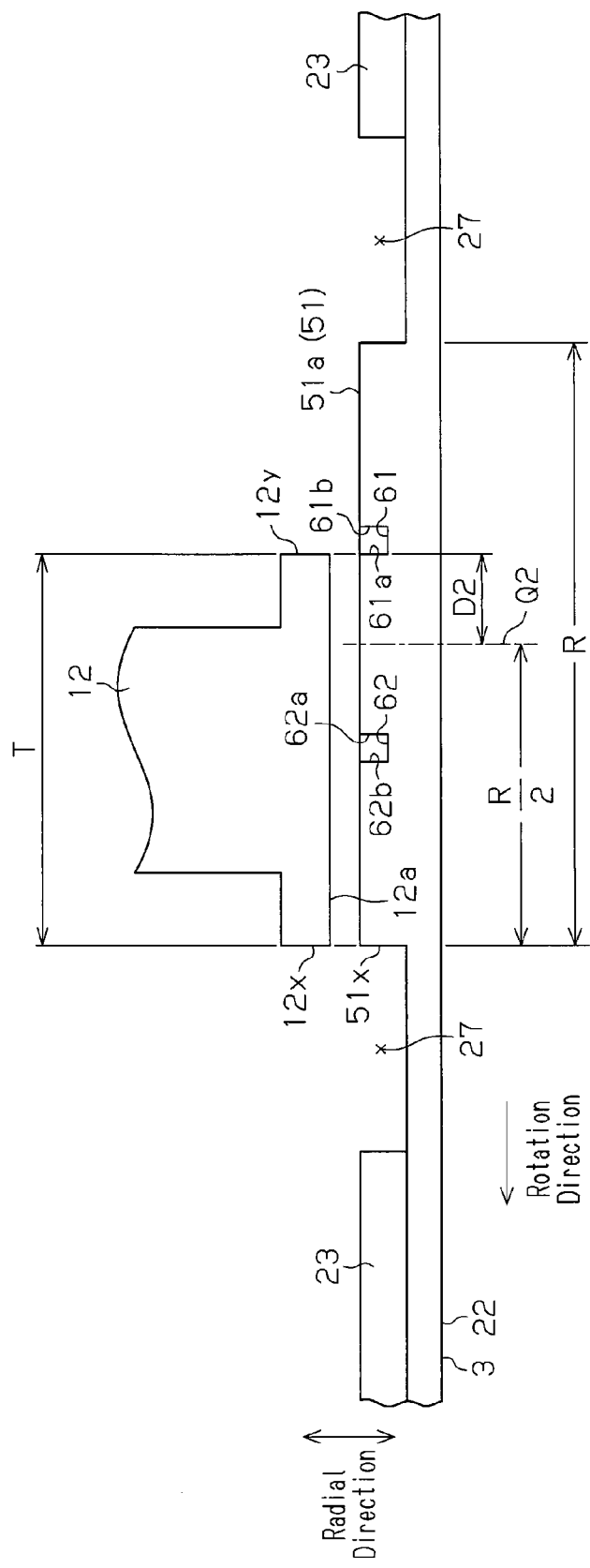

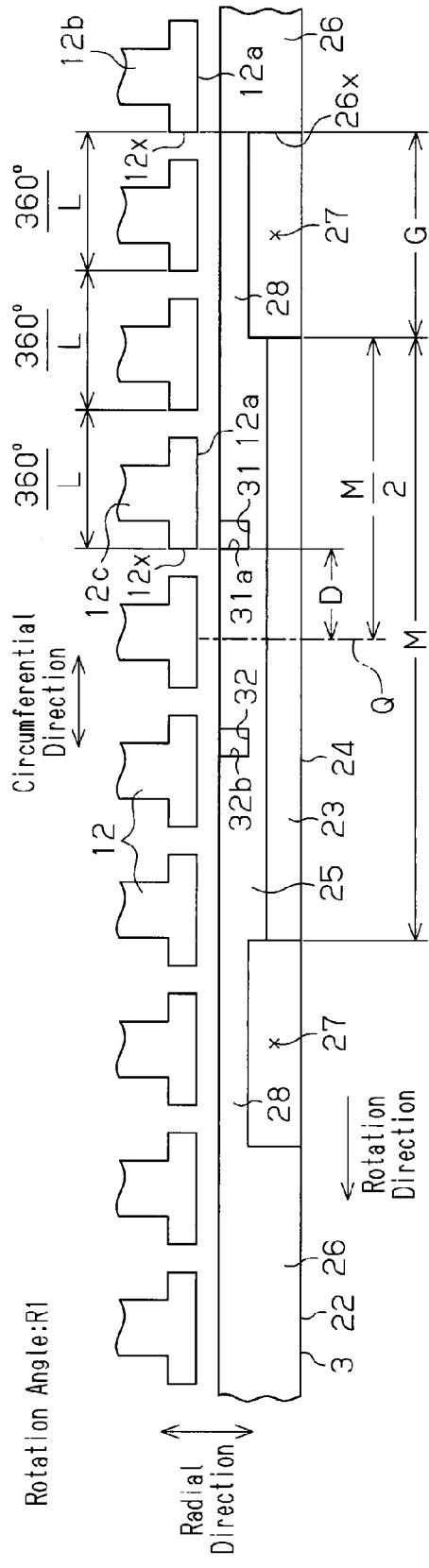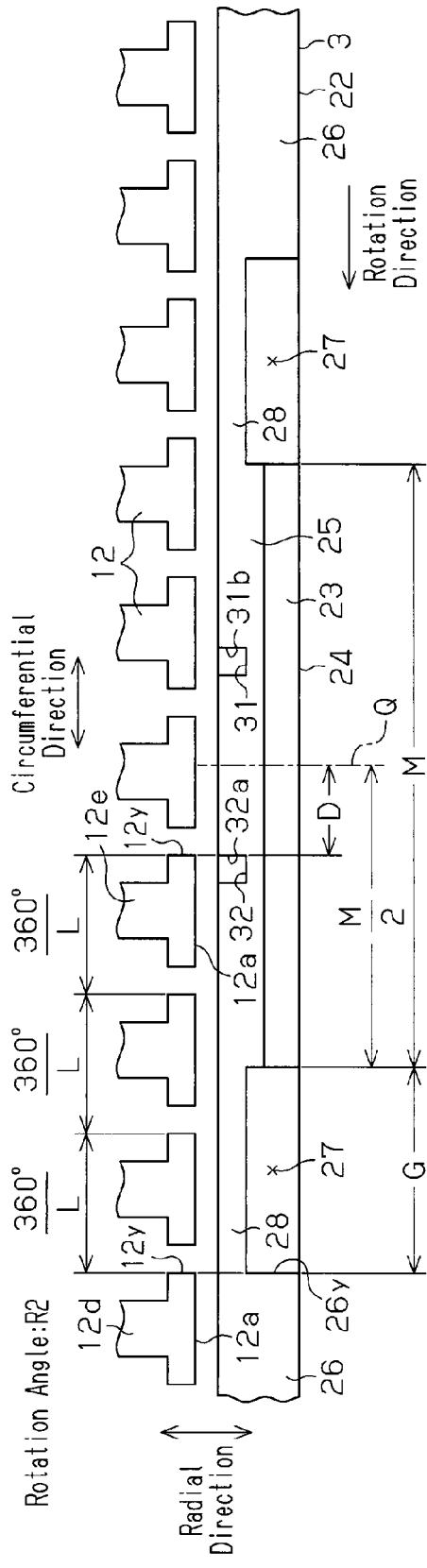

MOTOR

RELATED APPLICATIONS

This application claims the benefit of priority under 35 U.S.C. Section 119, to Japanese Patent Application Serial No. 2010-164018, filed on Jul. 21, 2010; and Japanese Patent Application Serial No. 2010-227825, filed on Oct. 7, 2010, which applications are incorporated herein by reference in their entirety.

BACKGROUND OF THE INVENTION

The present invention relates to a motor including a rotor adopting a consequent pole type structure.

Japanese Laid-Open Patent Publication No. 4-71342 describes a rotor of a so-called consequent pole type structure that is used in the motor. In such a rotor, a plurality of magnets are arranged along a circumferential direction of a rotor core. Core pole portions functioning as magnetic poles differing from the magnets are arranged between the magnets and formed integrally with the rotor core. The motor including such a rotor reduces the number of magnets in the rotor to one half without lowering performance and is thus advantageous since fewer natural resources are used and costs are reduced.

In a rotor of a consequent pole type structure, magnets that apply a compelling force on the magnetic flux (induction) are mixed with magnetic poles that do not apply a compelling force on the magnetic flux. Thus, there is a tendency for a magnetic imbalance to occur. This may increase vibration caused by the generation of cogging torque and thereby adversely affect the rotational performance. Accordingly, the rotor described in Japanese Laid-Open Patent Publication No. 4-71342 includes a groove extending along the axial direction in the outer surface of each magnet pole portion to suppress biasing of the magnetic flux in the magnet pole portion and reduce the cogging torque. However, the publication does not describe in detail how the groove of the magnet pole portion is set to effectively decrease vibration in the motor. Improvements may be made from this aspect.

SUMMARY OF THE INVENTION

It is an object of the present invention to provide a motor that reduces vibration and improves the rotation performance.

One aspect of the present invention is a motor including a rotor and a stator. The rotor includes a rotor core, a plurality of magnet pole portions arranged along a circumferential direction of the rotor core, and a plurality of core pole portions formed integrally with the rotor core, wherein each of the magnet pole portions is formed by embedding a magnet in the rotor core. Each of the core pole portions is arranged between the magnet pole portions that are adjacent to each other in the circumferential direction, and each of the core pole portions is spaced apart from the adjacent one of the magnet pole portions by a void. The stator includes a plurality of teeth, which are arranged at equal intervals along a circumferential direction and facing toward the rotor in a radial direction, and a plurality of windings, which are arranged on the plurality of teeth.

The magnet pole portions or the core pole portions define first magnetic pole portions. Each of the first magnetic pole portions includes a surface, which faces the teeth, and a first opposing part and a second opposing part, which are arranged in an axial direction. The first opposing part includes an auxiliary groove, which has two side surfaces facing toward each other in the circumferential direction, in part of the surface in the circumferential direction. The second opposing part entirely does not include the auxiliary groove in the surface in the circumferential direction.

Where M(°) represents an open angle of the first magnetic pole portion, G(°) represents an open angle of the void, and L represents the number of teeth, an angle D1 from a center line in the circumferential direction of the first magnetic pole portion to the side surface in the auxiliary groove that is closer to the center line in the circumferential direction satisfies D1=M/2+G−a×360(°)/L (where a is a natural number).

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 13 is a schematic view showing the motor of FIG. 11 in an unfolded state;

FIG. 15A is a schematic view showing a motor when the rotor of FIG. 14A is at a rotation angle R1;

FIG. 15B is a schematic view showing a motor when the rotor of FIG. 14A is at a rotation angle R2;

DETAILED DESCRIPTION OF THE INVENTION

A first embodiment of the present invention will now be described with reference to FIGS. 1 to 9.

Figure 1:
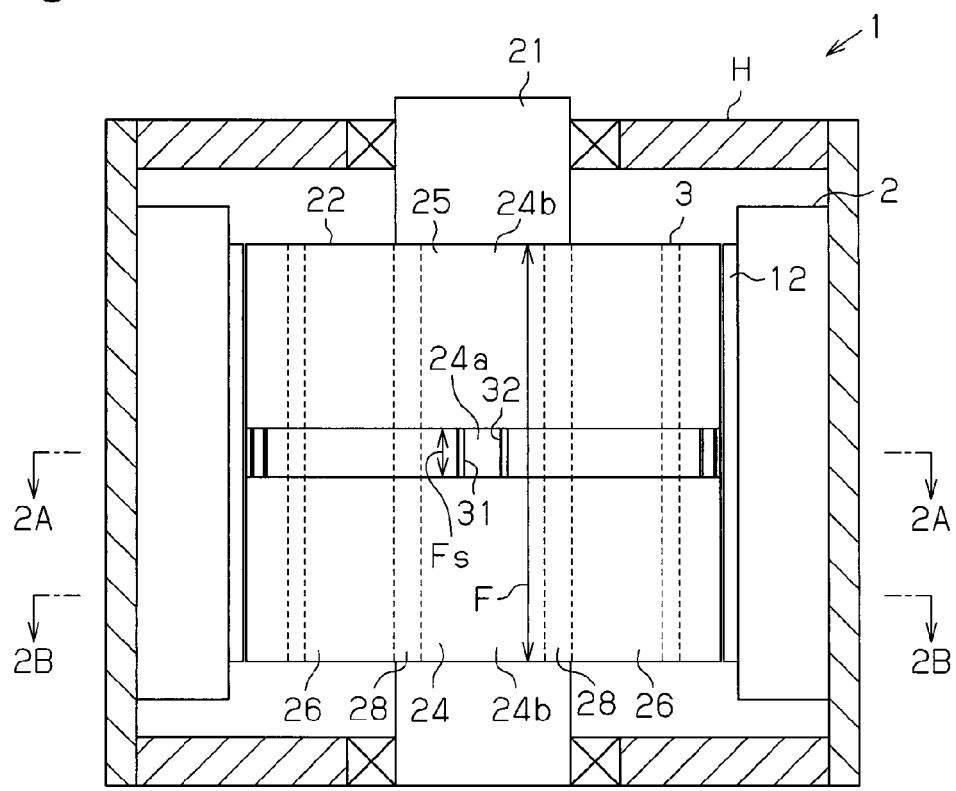
FIG. 1 is a side view schematically showing a motor according to a first embodiment of the present invention.

As shown in FIG. 1, an inner rotor type motor 1 of the first embodiment includes a generally annular stator 2, which is accommodated in a housing H, and a rotor 3, which is supported to be rotatable relative to the housing H in the inward radial direction from the stator 2.

Figure 2A:
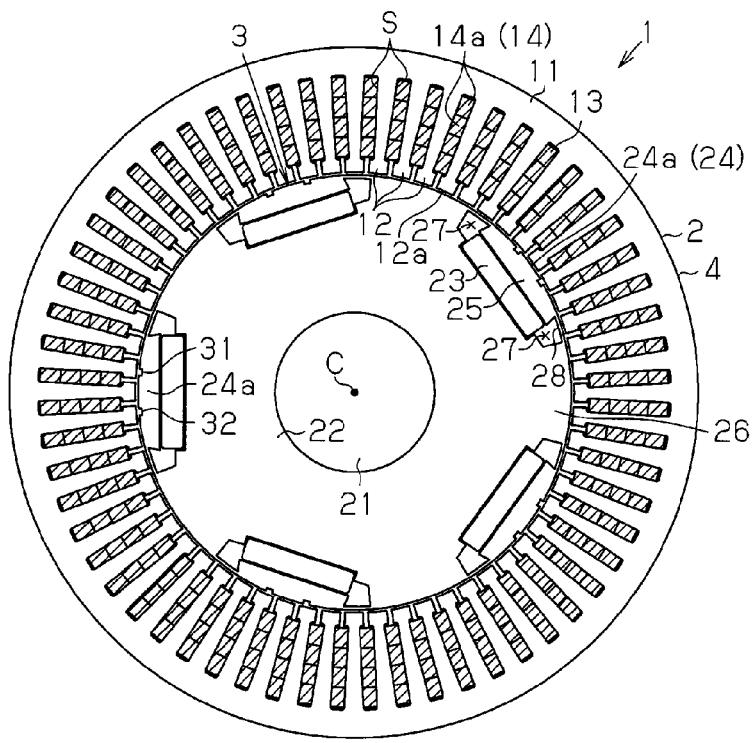
FIG. 2A is a cross-sectional view taken along line 2A-2A of FIG. 1.
Figure 2B:
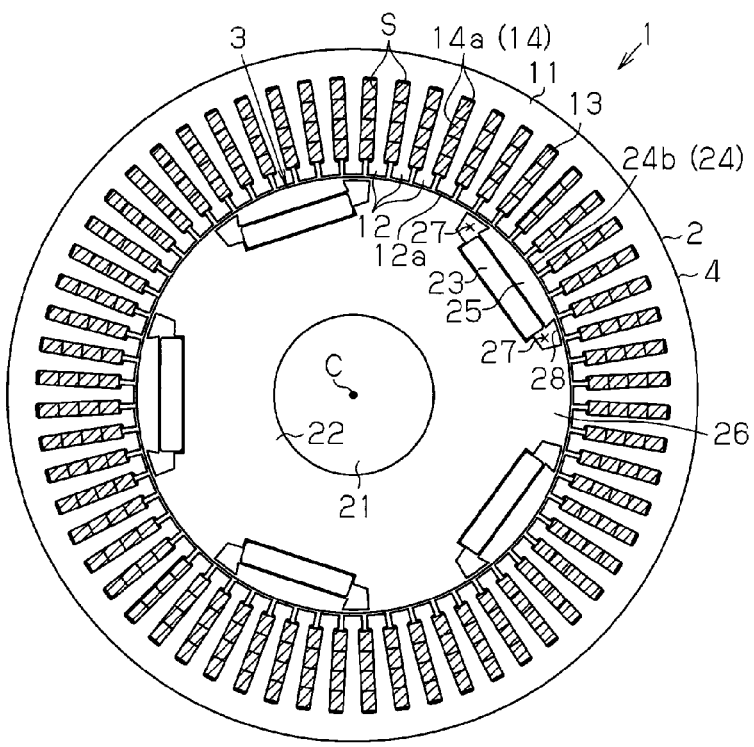
FIG. 2B is a cross-sectional view taken along line 2B-2B of FIG. 1.

As shown in FIGS. 2A and 2B, the stator 2 includes a cylindrical portion 11 and a stator core 4. The stator core 4 includes a plurality of (sixty in the present embodiment) teeth 12 extending in the inward radial direction from the cylindrical portion 11 and arranged in a circumferential direction. The stator core 4 is formed by arranging stacking members in a stack in the axial direction. The stacking members are metal plates having high magnetic permeability. A slot S is formed between pair of adjacent teeth 12. A segment winding 13, which generates a magnetic field to rotate the rotor 3, is inserted into each slot S. The slot S has a rectangular cross-section elongate in the radial direction as viewed from the axial direction. The number of slots S (sixty in the present embodiment) is the same number as the number of teeth 12. An insulator (not shown) is arranged between each tooth 12 and the corresponding segment winding 13.

The segment windings 13 form multiple phases (three phases in the present embodiment) and are connected to the stator core 4 as distributed windings. The segment windings 13 include a plurality of segment conductors 14 (refer to FIG. 4). Each segment conductor 14 has a tetragonal cross-section. Further, each segment conductor 14 includes two slot insertion portions 14a, two slot projections 14b, and a bent portion 14c. The slot insertion portion 14a is arranged in the corresponding slot S so as to extend through the slot S in the axial direction (direction orthogonal to the plane of the drawing). The slot projection 14b extends from an end of the corresponding slot insertion portion 14a so as to project out of the slot S in the axial direction. The bent portion 14c is arcuate and extends between the two slot insertion portions 14a. The segment conductors 14 forming the segment winding 13 of each phase are electrically connected by winding slot projections 14b that are adjacent to each other in the radial direction. The segment conductors 14 thus form a single segment winding 13, which is continuous in the circumferential direction. Each segment conductor 14 is generally U-shape and formed by bending a conductive plate. The two slot insertion portions 14a corresponding to the parallel linear portions of the U shape are respectively arranged in two of the slots S that are spaced apart by a plurality of (six) teeth 12 in the circumferential direction.

The rotor 3 includes a generally annular rotor core 22, which is fitted to a rotation shaft 21. The rotor core 22 is formed by arranging stacking members in a stack. The stacking members are metal plates having high magnetic permeability in the axial direction. Five magnets 23 forming N poles are embedded in an outer circumferential part of the rotor core 22 at an interval of 72° in the circumferential direction to form magnet pole portions 24. That is, each magnet pole portion 24 includes a magnet 23 and the part of the rotor core 22 located at the outer circumferential side (outer circumferential part 25) of the magnet 23.

The magnet 23 is generally bar-shaped and elongated in a direction orthogonal to the radial direction of the rotor 3 as viewed from the axial direction of the rotor 3. Core pole portions 26 are formed integrally with the rotor core 22. A void 27 is formed between each core pole portion 26 and the magnet pole portion 24 that is adjacent in the circumferential direction. The voids 27 each have the same area as viewed from the axial direction. Coupling portions 28 are formed at the outer circumferential side of the voids 27 to connect the outer circumferential parts 25 of the magnet pole portions 24 and the core pole portions 26. The continuous outer circumferential surface of the outer circumferential parts 25, the core pole portions 26, and the coupling portions 28 form the outer circumferential surface of the rotor 3.

Figure 3:
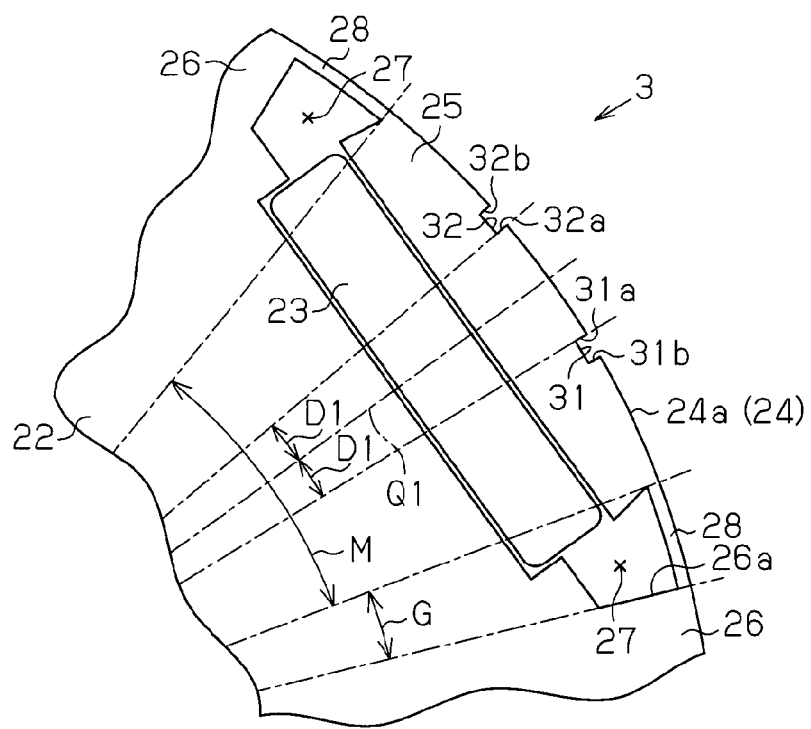
FIG. 3 is an enlarged plan view showing a magnet pole portion of FIG. 2A.
Figure 4:
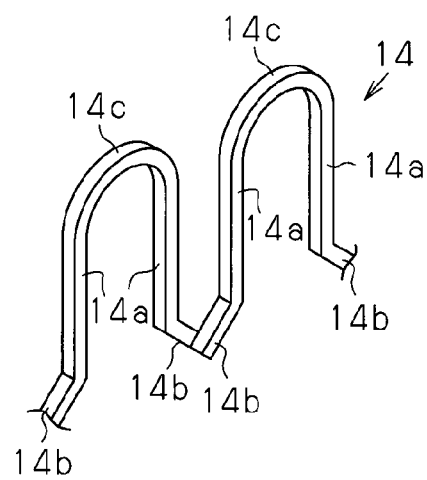
FIG. 4 is a partial perspective view showing a segment conductor of FIG. 2A.

As shown in FIG. 3, each magnet pole portion 24 and the adjacent voids 27 are in symmetry with respect to a line Q1, extending through the center of the magnet pole portion 24 in the circumferential direction. The center line Q1 extends along the radial direction and through an axis C of the rotor 3. The areas of all voids 27 in the rotor 3 when viewed from the axial direction are the same. The voids 27 each have the same area as viewed from the axial direction of the rotor core 22. The magnet pole portions 24 and the core pole portions 26 are alternately arranged at equal angular intervals of 36°. The rotor 3 is of a so-called consequent pole type including ten magnetic poles in which the core pole portions 26 function as S poles and the magnet pole portions 24 function as N poles. The number of pole pairs of the rotor 3 is the same number as that of the magnets 23. In the first embodiment, the number of pole pairs is five. The number of teeth 12 over which each segment conductor 14 extends across is determined by the number of slots divided by the number of magnetic poles. In the first embodiment, the number of teeth 12 is six (60/10).

The stator 2 of the first embodiment is formed so that the number L of teeth 12 satisfies "L=2×p×m×n", where p is the number of magnets 23 (number of pole pairs) of the rotor 3 and is an integer greater than or equal to two, m is the number of phases of the segment windings 13, and n is a natural number. Using this equation, the number L of teeth 12 is set to L=2×5 (number of magnets 23)×3 (number of phases)×2=60 in the first embodiment.

As shown in FIG. 1, each magnet pole portion 24 includes a first opposing part 24a (refer to FIG. 2A) and two second opposing parts 24b (refer to FIG. 2B) arranged along the axial direction. The first opposing part 24a is arranged between the second opposing parts 24b. The first opposing part 24a includes two auxiliary grooves 31 and 32 in the outer circumferential surface of the outer circumferential part 25 (surface facing the teeth 12). The auxiliary grooves 31 and 32 extend entirely over the axial length Fs of the first opposing part 24a and are not formed in the second opposing parts 24b.

As shown in FIG. 3, the two auxiliary grooves 31 and 32 of the first opposing part 24a are arranged at symmetric positions relative to the center line Q1. The auxiliary grooves 31 and 32 have the same shape. The groove 31 includes two side surfaces 31a and 31b facing toward each other in the circumferential direction. The groove 32 includes two side surfaces 32a and 32b facing toward each other in the circumferential direction. The side surfaces 31a and 32a are located at the inner side (closer to the center line Q1 in the circumferential direction) of the corresponding auxiliary grooves 31 and 32. The side surfaces 31b and 32b are located at the outer side (closer to the edge of the corresponding magnet pole portion 24 in the circumferential direction of) of the corresponding grooves 31 and 32. The auxiliary grooves 31 and 32 each extends linearly along the axial direction.

As shown in FIG. 1, the first opposing part 24a, which includes the auxiliary grooves 31 and 32, is arranged at the middle of the magnet pole portion 24 in the axial direction. The second opposing parts 24b are arranged at opposite sides of the first opposing part 24a in the axial direction. The first opposing part 24a and the second opposing parts 24b may be discrete bodies or be formed integrally. In the first embodiment, each of the auxiliary grooves 31 and 32 have an axial length Fs, which is the axial length of the first opposing part 24a, and each magnet pole portion 24 has an axial length F. The ratio Fs/F satisfies Fs/F=0.11.

Here, an open angle of the magnet pole portion 24 at the outer circumferential surface is represented by M(°), an open angle of the void 27 is represented by G(°), and the number of teeth 12 is represented by L. In this case, a position angle D1 of each of the auxiliary grooves 31 and 32 (angle D1 from the center line Q1 of the magnet pole portion 24 to the side surfaces 31a and 32a of the auxiliary grooves 31 and 32) is set to satisfy D1=M/2+G−a×360(°)/L, where a represents a natural number (refer to FIG. 5). The open angle refers to the angular range of which the center is the axis C of the rotor 3. Here, the open angle refers to the angular range of the magnet pole portion 24 in the circumferential direction or an angular range of the void 27 in the circumferential direction. The open angle G of the void 27 refers to the open angle of the void 27 at the outermost side in the radial direction (i.e., open angle of outer circumferential surface of coupling portion 28) (refer to FIG. 3). In the mathematical formula, 360(°)/L represents an angular range of which the center is the axis C and which extends from one tooth 12 to the adjacent tooth 12 between the ends of located at the same circumferential side of the corresponding tooth 12. That is, 360(°)/L represents the interval of the teeth 12 in the circumferential direction.

Figure 5:
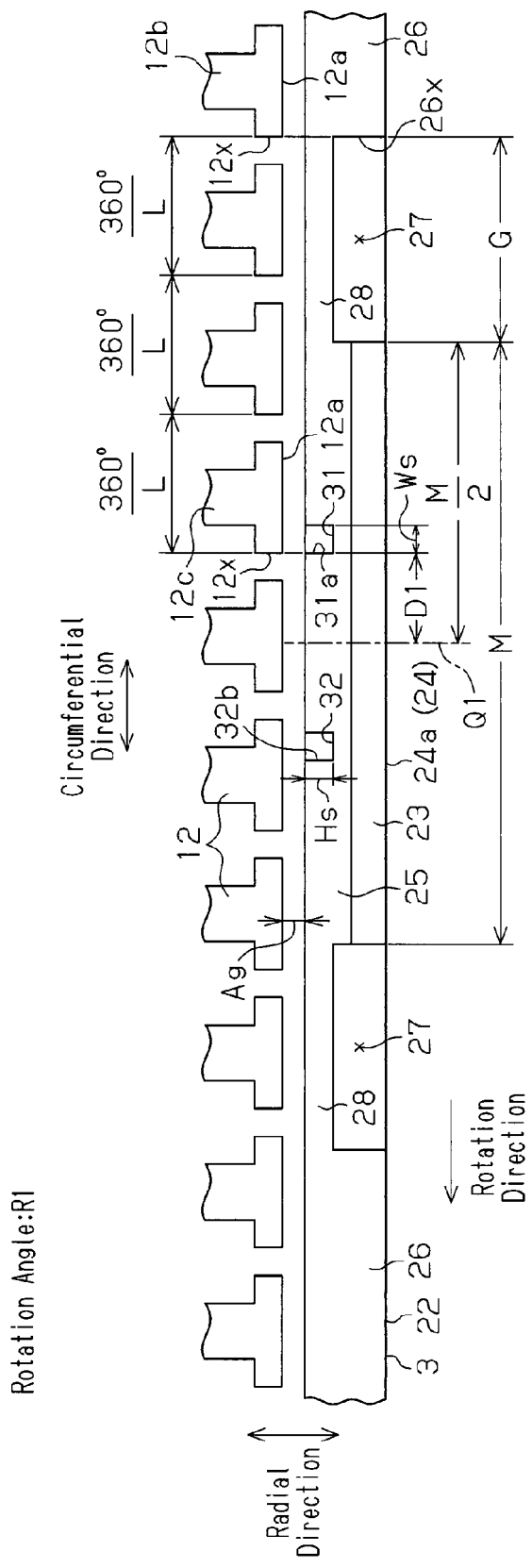
FIG. 5 is a schematic view showing the motor of FIG. 2A in a developed manner.

When the position angle D1 of the auxiliary grooves 31 and 32 is set as described above, the teeth 12, the core pole portions 26, and the auxiliary grooves 31 satisfy the positional relationship shown in FIG. 5. More specifically, a tooth 12 (tooth 12b at the right end in FIG. 5) includes a distal portion 12a with a first circumferential end 12x. A core pole portion 26 includes a first circumferential end 26x. When the first circumferential end 12x overlaps in the radial direction with the first circumferential end 26x, the side surface 31a in the auxiliary groove 31 of the adjacent magnet pole portion 24 located at the forward side of the core pole portion 26 in the rotation direction overlaps with a first circumferential end 12x of the ath tooth 12, namely, the third tooth 12 in the example of FIG. 5 (tooth 12c) in the circumferential direction (leftward in FIG. 5) from the tooth 12b. Here, overlapping in the radial direction indicates that two subjects are aligned with each other in the radial direction. In FIG. 5, the first circumferential end 26x of a core pole portion 26 is radially overlapped with the first circumferential end 12x of the tooth 12b. Thus, magnetic flux easily concentrates at the radially overlapping portion. This raises the cogging torque (main component) to its peak. Further, the side surface 31a of an auxiliary groove 31 overlaps in the radial direction with the first circumferential end 12x of the tooth 12c. Thus, the magnetic flux easily concentrates at the radially overlapping portion and the cogging torque generated at the auxiliary groove 31 becomes a reverse peak. The cogging torque generated during rotation of the rotor 3 is decreased. The cogging torque generated at the auxiliary groove 31 functions as a component that cancels the cogging torque (main component) generated near the first circumferential end 26x of the core pole portion 26. A similar phenomenon occurs in the other auxiliary groove 32.

Figure 6:
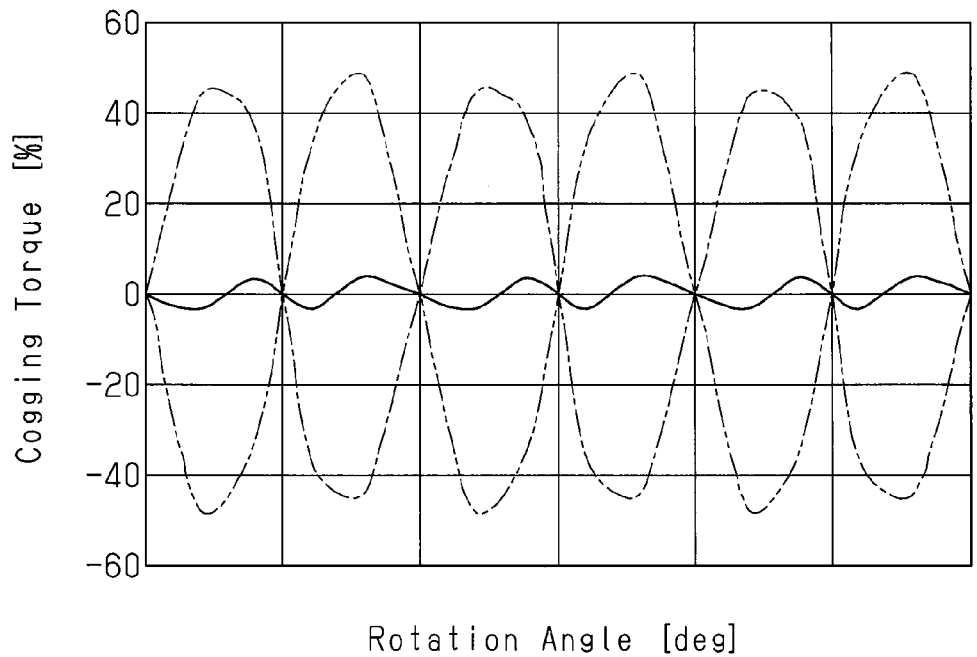
FIG. 6 is a characteristic diagram showing the relationship between the rotation angle of the rotor and the cogging torque.

FIG. 6 shows the waveform of the cogging torque generated in the motor 1. In FIG. 6, the maximum value of the cogging torque of a structure that does not include the auxiliary grooves 31 and 32 is 100%. The waveform of the cogging torque generated at the first opposing part 24a is indicated by a double-dashed line. The waveform of the cogging torque generated at the second opposing part 24b is indicated by a single-dashed line. As shown in FIG. 6, the cogging torque generated at the second opposing part 24b has a phase that is opposite to the phase of the cogging torque generated at the first opposing part 24a. This results in the combined torque being small (waveform indicated by solid line in FIG. 6). In this manner, in the present embodiment, the first opposing part 24a and the second opposing part 24b are aligned in the axial direction to prevent the cogging torque (cancellation component) generated at the auxiliary grooves 31 and 32 from becoming too large with respect to the main component of the cogging torque. Accordingly, the cogging torque generated in the entire motor 1 is decreased in a desirable manner, and the rotation performance of the rotor 3 is further improved.

Figure 7:
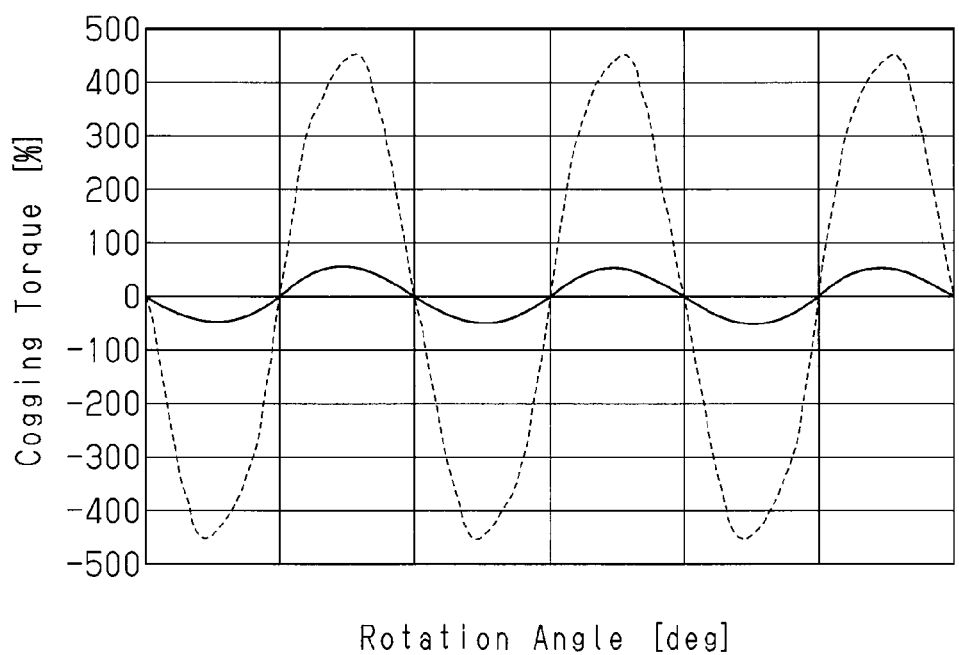
FIG. 7 is a characteristic diagram showing the relationship between the rotation angle of the rotor and the cogging torque.

In FIG. 7, the broken line indicates the cogging torque generated in the entire motor 1 in a structure in which the auxiliary grooves 31 and 32 are formed in the magnet pole portions 24 entirely in the axial direction (i.e., structure satisfying Fs/F=1.0). The solid line indicates the cogging torque generated in the entire motor 1 of the first embodiment (Fs/F=0.11). In FIG. 7, the maximum value of the cogging torque of the structure that does not include the auxiliary grooves 31 and 32 are not arranged is 100%. As shown in FIG. 7, the cogging torque generated in the entire motor 1 of the first embodiment is decreased from the cogging torque generated in the structure satisfying Fs/F=1.0 (structure that does not include the second opposing parts 24b). In other words, FIG. 7 shows the decreasing effect of the cogging torque resulting from the arrangement of the second opposing parts 24 in the magnet pole portions 24.

Figure 8:
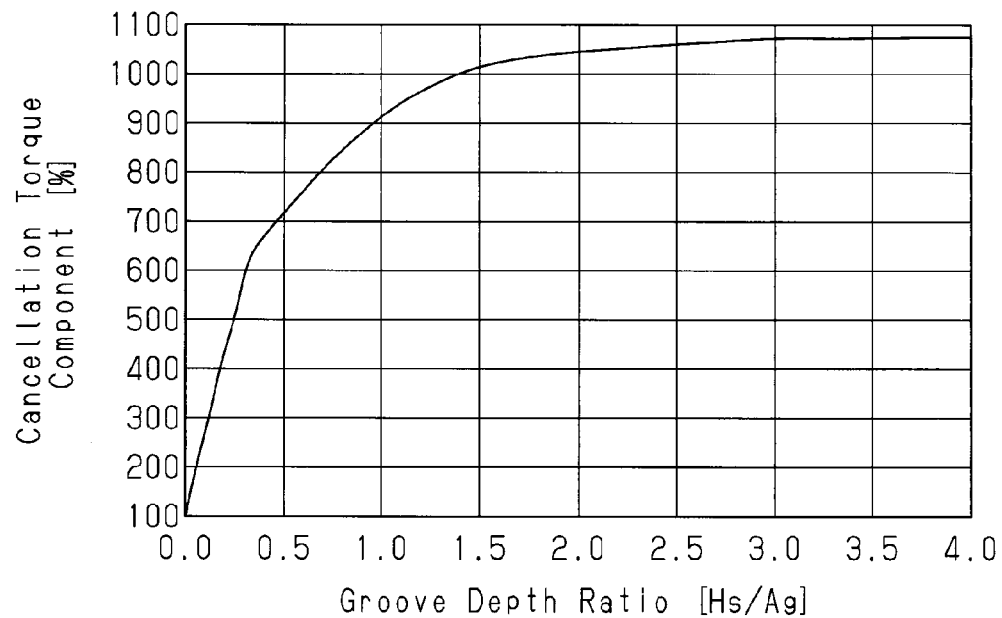
FIG. 8 is a characteristic diagram showing the relationship between a groove depth ratio and a cancellation torque component.
Figure 9:
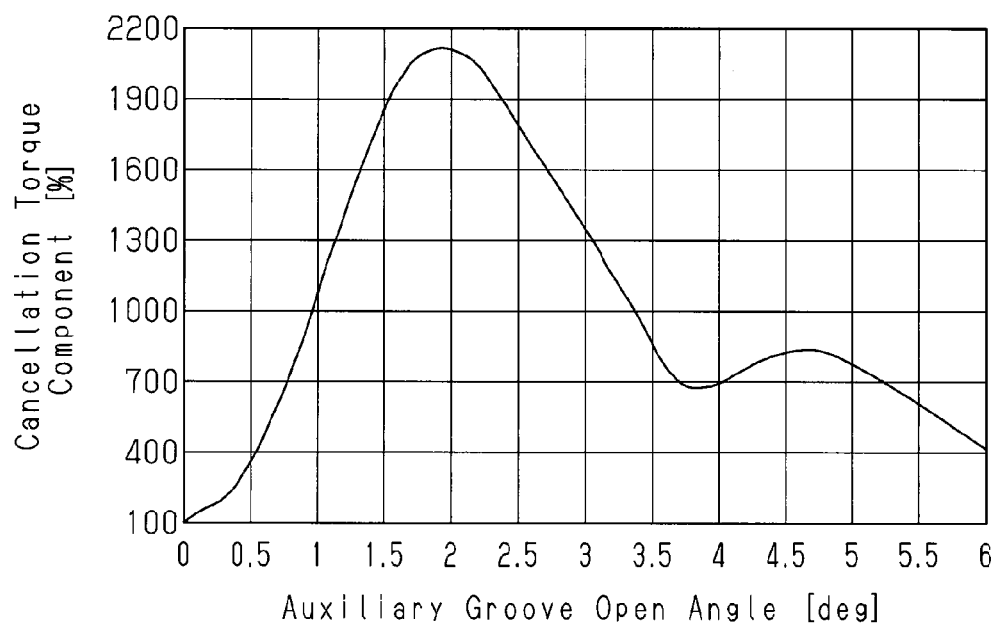
FIG. 9 is a characteristic diagram showing the relationship between an open angle of the auxiliary groove and the cancellation torque component.

The characteristic diagram of FIGS. 6 and 7 are obtained under the conditions in which the open angle of the core pole portion 26 is 23.6°, the position angle D1 of the auxiliary grooves 31 and 32 is 7.6°, the open angle Ws of the auxiliary grooves 31 and 32 is 1.265°, and a groove depth Hs of the auxiliary grooves 31 and 32 and an air gap Ag between the rotor 3 and the teeth 12 satisfy a groove depth ratio Hs/Ag of 1.333. FIG. 8 shows the cancellation torque component when the groove depth ratio Hs/Ag is varied under the above conditions. FIG. 9 shows the cancellation torque component when the open angle Ws of the auxiliary grooves 31 and 32 is varied under the above conditions. In FIGS. 8 and 9, the cancellation torque component of a structure that does not include the auxiliary grooves 31 and 32 is 100%.

The optimal value for a in the above expression is obtained from the understanding that the cogging torque is most effectively decreased when setting a to such a value. The number of teeth 12 over which the segment conductor 14 extends is obtained by dividing the number of slots by the number of magnetic poles as described above. By arranging the auxiliary grooves 31 and 32 at where the number of teeth 12 is one half, cancellation components (cogging torque generated by the auxiliary grooves 31 and 32), which decrease the cogging torque, are arranged in the circumferential direction in a balanced manner. This further increases the effectiveness. Thus, it is preferable that a be obtained from the equation of a=L/(E×2), where L represents the number of teeth 12 (number of slots) and E represents the number of magnetic poles of the rotor 3. In the first embodiment, the cogging torque is effectively reduced when a=60/(10×2)=3 is satisfied.

The first embodiment has the advantages described below.

(1) In the first embodiment, the first opposing parts 24a of the magnet pole portions 24 includes the auxiliary grooves 31 and 32 to satisfy D1=M/2+G−a×360(°)/L, where a is a natural number. Thus, for example, when the first circumferential end 12x of the distal portion 12a of the tooth 12b overlaps in the radial direction with the first circumferential end 26x of the core pole portion 26, the side surface 31a of the auxiliary groove 31 of the magnet pole portion 24 adjacent to the core pole portion 26 overlaps in the radial direction with the first circumferential end 12x of the ath tooth 12c in the circumferential direction from the tooth 12b. In this case, the cogging torque generated at the auxiliary grooves 31 and 32 functions as a cancellation component that decrease the cogging torque generated at the first circumferential end 26x of the core pole portion 26. Thus, the cogging torque generated in the entire motor 1 is decreased and the rotation performance of the rotor 3 is improved. Further, each magnet pole portion 24 includes the first opposing part 24a, though which the auxiliary grooves 31 and 32 extend in the circumferential direction, and the second opposing parts 24b, which do not entirely include the auxiliary grooves 31 and 32 in the circumferential direction. The first opposing part 24a and the second opposing parts 24a are arranged in the axial direction. Thus, the auxiliary grooves 31 and 32 are arranged in the axial direction in a balanced manner, and the cogging torque (cancellation component) generated at the auxiliary grooves 31 and 32 is prevented from becoming too large with respect to the main component of the cogging torque. Accordingly, the cogging torque generated in the entire motor 1 is decreased in a desirable manner, and the rotation performance of the rotor 3 is further improved.

(2) In the first embodiment, the auxiliary grooves 31 and 32 are paired in the circumferential direction in symmetry relative to the center line Q1 in the circumferential direction of each magnet pole portion 24. In this manner, the auxiliary grooves 31 and 32 are arranged as a pair for each core pole portion 26 on opposite sides of the magnet pole portion 24. This further decreases the cogging torque.

(3) In the first embodiment, the segment windings 13 of the stator 2 are formed by distributed windings. Thus, the cogging torque is decreased in the motor 1 that includes the stator 2 in which the segment windings 13 formed by distributed windings. This improves the rotation performance of the rotor 3.

The first embodiment may be modified as described below.

In the first embodiment, the auxiliary grooves 31 and 32 are arranged in the magnet pole portion 24 but may be arranged in the core pole portions 26.

Figure 10:
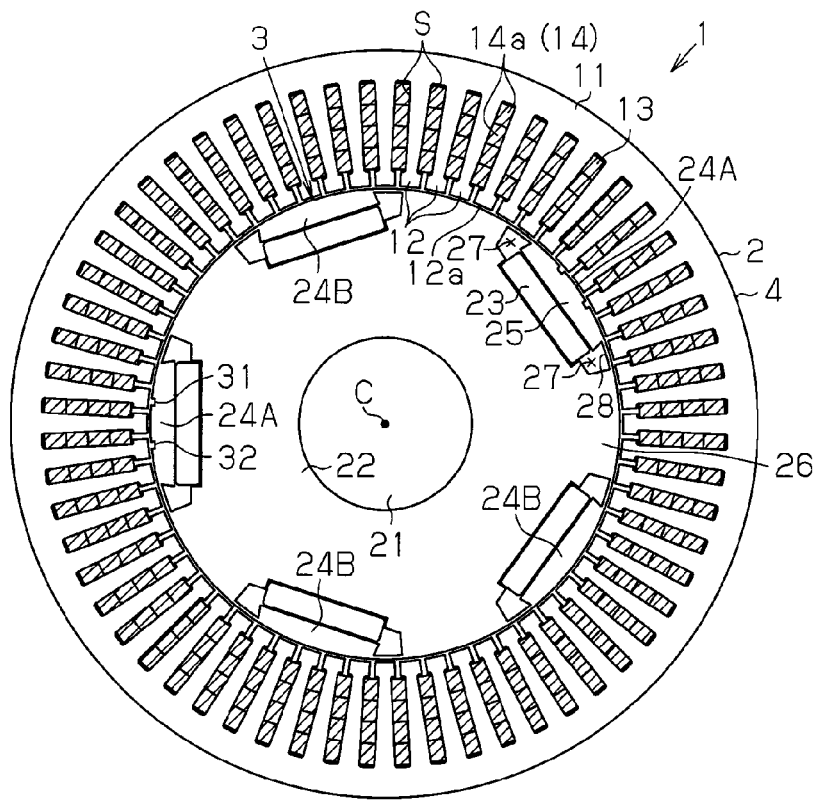
FIG. 10 is a schematic diagram showing another example of a motor.

In the first embodiment, the first opposing parts 24, each including the auxiliary grooves 31 and 32, and the second opposing parts 24b, each free from the auxiliary grooves 31 and 32, are arranged in the axial direction. However, the present invention is not limited to such a structure. For example, as shown in FIG. 10, the magnet pole portions 24 may include magnet pole portions 24A, which include auxiliary grooves 31 and 32 in their outer circumferential surface, and magnet pole portions 24B, which do not include the auxiliary grooves 31 and 32 in their outer circumferential surfaces. In the example shown in FIG. 10, there are two magnet pole portions 24A, which include grooves, and three magnet pole portions 24B, which do not include grooves. At least one magnet pole portion 24B is arranged between two magnet pole portions 24A in the circumferential direction so that magnet pole portions 24A, which do not include grooves, are not continuously arranged in the circumferential direction.

Such a structure obtains advantages similar to those of the first embodiment. In other words, in such configuration, the auxiliary grooves 31 and 32 are arranged in a balanced manner in the circumferential direction. Thus, the cogging torque (cancellation component) generated at the auxiliary grooves is prevented from becoming too large with respect to the main component of the cogging torque. Accordingly, the cogging torque generated in the entire motor 1 is decreased in a desirable manner, and the rotation performance of the rotor 3 is further improved.

In this structure, the auxiliary grooves 31 and 32 may be formed in the corresponding magnet pole portions 24 entirely in the axial direction or partially in the axial direction like in the first embodiment. Further, the auxiliary grooves 31 and 32 may be formed in the core pole portions 26 instead of the magnet pole portions 24, and the core pole portions 26 may include those provided with grooves and those free from grooves.

The first embodiment is applied to an IPM motor in which the magnets 23 are embedded in the rotor core 22. However, the present invention is not limited in such a manner. For example, the present invention may be embodied in an SPM motor in which the magnets 23 are arranged on the surface of the rotor core 22. In the configuration shown in FIGS. 11 to 12B, the stator 2 includes twelve teeth 12 and coils 41 for the U phase, V phase, and W phase sequentially wound the teeth 12 as concentrated windings. The inner circumferential surface of a distal portion 12a of each tooth 12 is arcuate. The center of the arcuate surface lies along the axis C of the motor 1.

In the rotor 3, four N pole magnets 23 are arranged at equal intervals in the circumferential direction along the outer circumferential part of the rotor core 22. A salient pole 51 (core pole portion), which is integrally formed with the outer circumferential part of the rotor core 22, is arranged between the magnets 23. That is, the magnets 23 and the salient poles 51 are alternately arranged at equal angular intervals, and the rotor 3 is of a so-called consequent pole type including eight magnetic poles in which the salient poles 51 function as S poles and the magnets 23 function as N poles. The number of the magnetic poles (eight) of the rotor 3 is two thirds the number of teeth 12 (twelve). Thus, the ratio of the number of magnetic poles of the rotor 3 to the number of teeth 12 is 2:3.

The center of the outer circumferential surface of each magnet 23, which is arcuate, lies along the axis C. Further, the circumferential length of the magnet 23 is greater than that of the salient poles 51. An inner side surface of the magnet 23 is fixed to a fixing surface 52 arranged between adjacent salient poles 51 of the rotor core 22. Further, a void 27, which extends in the circumferential direction, is arranged between adjacent salient poles 51. The magnets 23 are formed so that their outer circumferential surfaces lie along the same circumference.

Each salient pole 51 is generally triangular and projects in an outward radial direction. The outer circumferential surface of the salient pole 51 is curved. An open angle R of each salient pole 51 of which the center lies along the axis C is greater than the open angle T of the distal portion 12a of each tooth 12 of which the center lies along the axis C (refer to FIG. 13).

Figure 11:
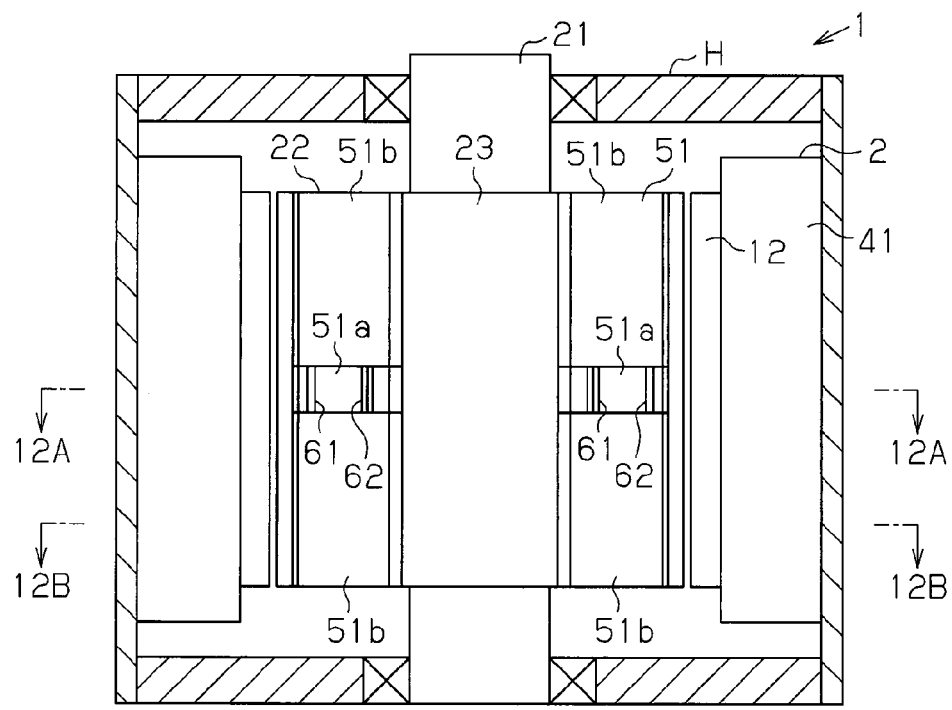
FIG. 11 is a side view schematically showing still another example of a motor.
Figure 12A:
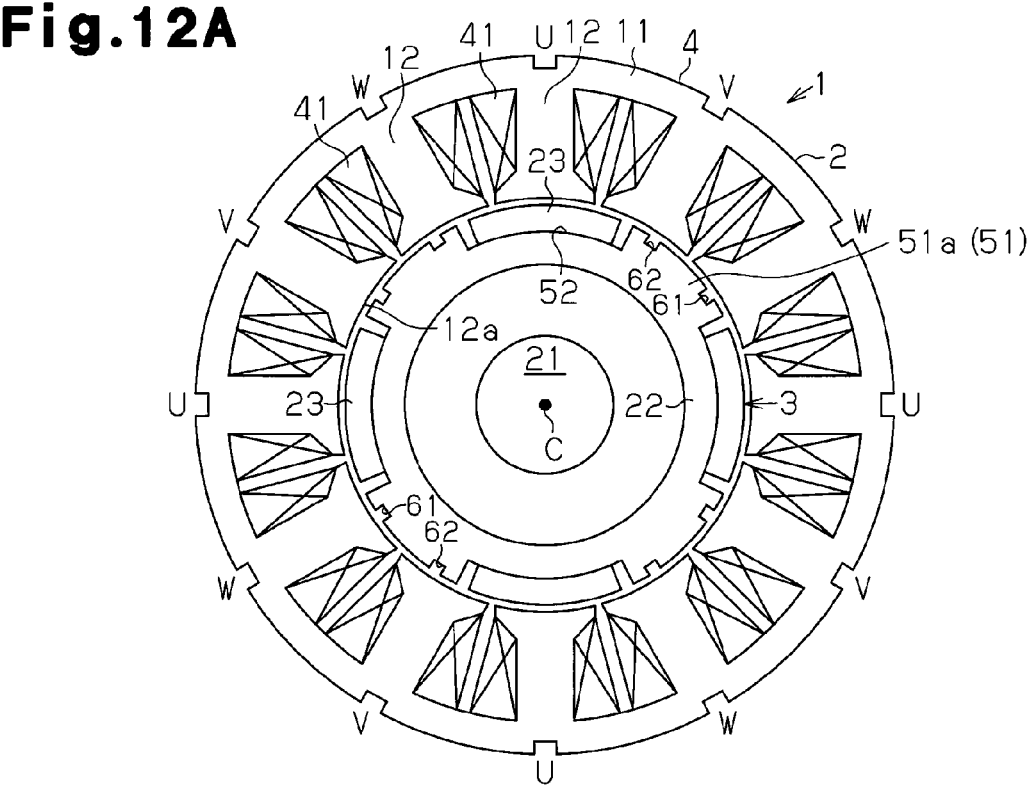
FIG. 12A is a cross-sectional view taken along line 12A-12A of FIG. 11.
Figure 12B:
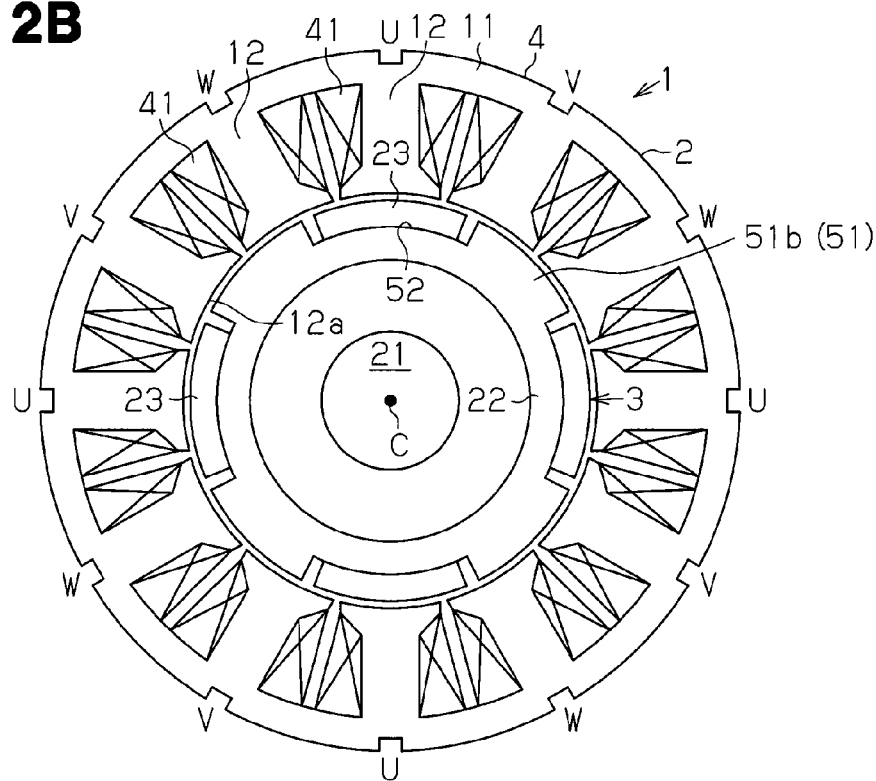
FIG. 12B is a cross-sectional view taken along line 12B-12B of FIG. 11.
Figure 14A:
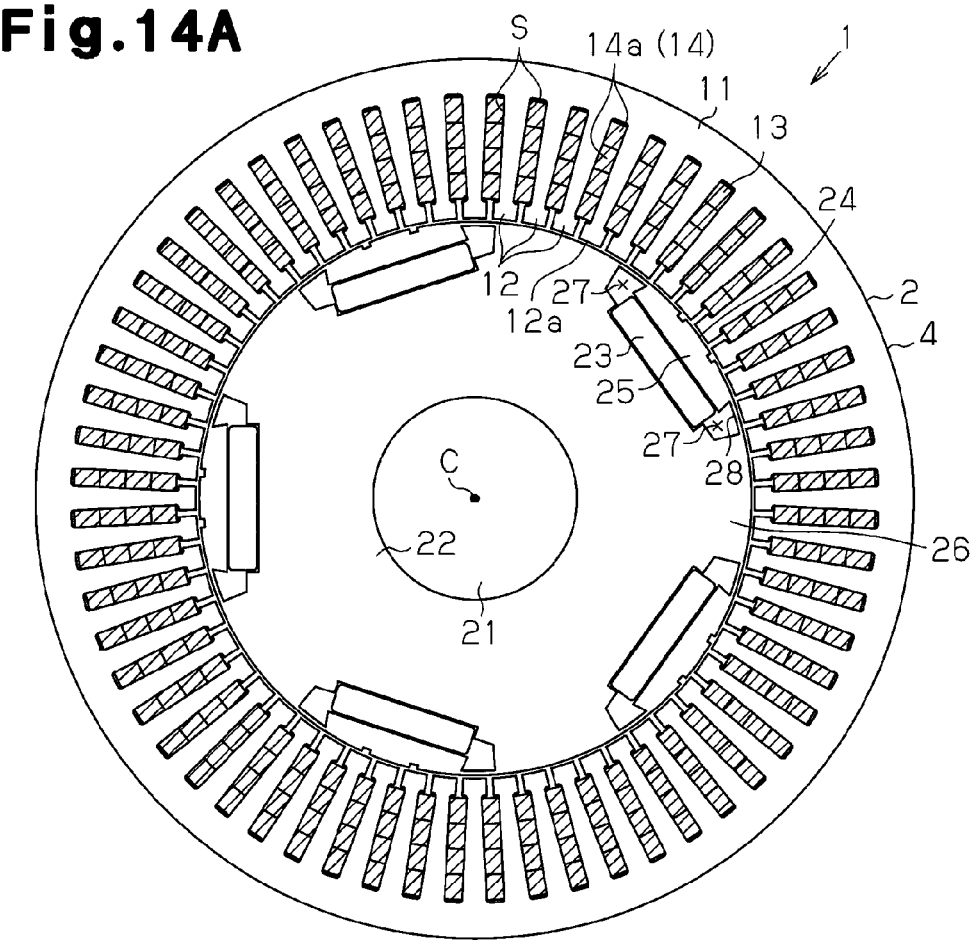
FIG. 14A is a schematic diagram showing a motor according to a second embodiment of the present invention.
Figure 14B:
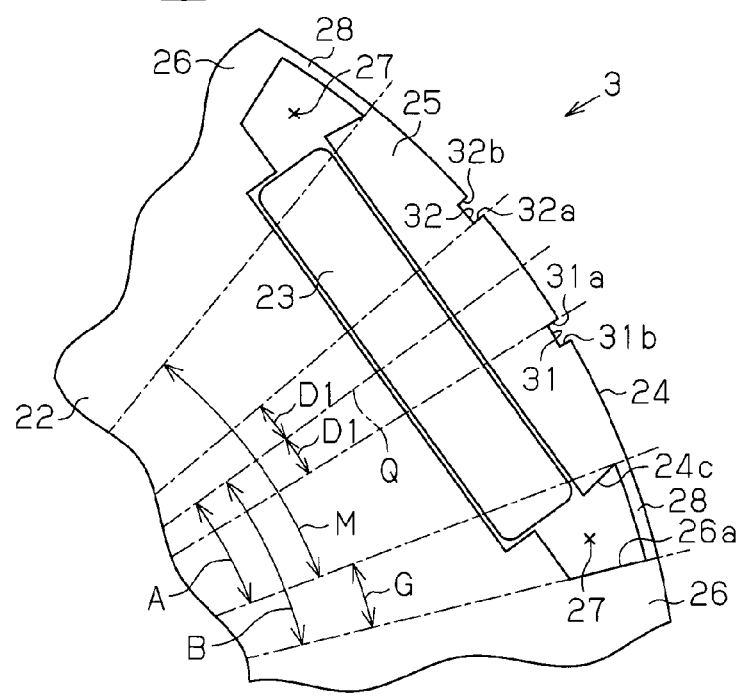
FIG. 14B is a partially enlarged view of FIG. 14A.

As shown in FIG. 11, each salient pole 51 includes a first opposing part 51a (refer to FIG. 12A), each provided with two auxiliary grooves 61 and 62 in the outer circumferential surface (i.e., the surface facing the teeth 12), and second opposing parts 51b (refer to FIG. 12B), which are free of the auxiliary grooves 61 and 62 over the entire circumferential direction of the outer circumferential surface. The first opposing part 51a and the second opposing parts 51b are arranged in the axial direction. The first opposing part 51a is arranged at the middle of the salient pole 51 in the axial direction, and the second opposing parts 51b are arranged on opposite sides of the first opposing part 51a in the axial direction.

The two auxiliary grooves 61 and 62 of the first opposing part 51a are arranged in symmetry with respect to a line Q2 extending through the center of the salient pole 51 in the circumferential direction. The auxiliary grooves 61 and 62, which have the same shape, respectively include two opposing side surfaces 61a and 61b and two opposing side surfaces 62a and 62b. The side surfaces 61a and 62a are located at the inner sides of the corresponding auxiliary grooves 61 and 62 and are closer to the center line Q2. The side surfaces 61b and 62b are located at the outer sides of the corresponding auxiliary grooves 61 and 62 closer to the circumferential ends of the adjacent salient pole 51. The auxiliary grooves 61 and 62 linearly extend in the axial direction.

Here, T(°) represents the open angle of the distal portion 12a of each tooth 12 and R(°) represents the open angle of each salient pole 51. In this case, a position angle D2 of each of the auxiliary grooves 61 and 62 (angle D2 from the center line Q2 of the salient pole 51 to the side surfaces 61a and 62a of the auxiliary grooves 61 and 62) is set to satisfy D2=T−R/2. Accordingly, as shown in FIG. 13, when the first circumferential end 12x of the distal portion 12a of a tooth 12 overlaps in the radial direction with a first circumferential end 51x of the salient pole 51, a second circumferential end 12y of the distal portion 12a of the tooth 12 overlaps in the radial direction with the side surface 61a of an auxiliary groove 61. Thus, when the first circumferential end 12x of the tooth 12 overlaps in the radial direction with the first circumferential end 51x of the salient pole 51, magnetic flux easily concentrates at the radially overlapping portion and the main component of the cogging torque rises to a peak. Here, the second circumferential end 12y of the tooth 12 overlaps in the radial direction with the side surface 61a of an auxiliary groove 61. Thus, magnetic flux easily concentrates at the radially overlapping portion and the cogging torque generated at the portion of the auxiliary groove 61 becomes a reverse peak. In other words, the cogging torque generated during rotation of the rotor 3 is decreased. The cogging torque serves as a cancellation component that cancels the main component of the cogging torque generated at the first circumferential end 51x of the salient pole 51 in the auxiliary groove 61. A similar phenomenon occurs in the other auxiliary groove 62.

In the same manner as in the first embodiment, in the structure shown in FIGS. 11 to 13, the first opposing part 51a, which include the auxiliary grooves 61 and 62, and the second opposing parts 51b, which do not include the auxiliary grooves 61 and 62, are arranged in the axial direction. Thus, the auxiliary grooves 61 and 62 are arranged in a balanced manner in the axial direction. The cogging torque (cancellation component) generated at the auxiliary grooves 61 and 62 is thus prevented from becoming too large relative to the main component of the cogging torque. Therefore, the cogging torque generated in the entire motor 1 is decreased in a desirable manner, and the rotation performance of the rotor 3 is further improved. Further, the two auxiliary grooves 61 and 62 are arranged in the circumferential direction to be symmetric with respect to the center line Q2 in the circumferential direction of the salient pole 51. In this manner, two auxiliary grooves 61 and 62 are arranged in correspondence with two circumferential ends of the salient pole 51. This further decreases the cogging torque.

In the example shown in FIGS. 11 to 13, each salient pole 51 is formed so that the first opposing part 51a, which includes the auxiliary grooves 61 and 62, and the second opposing parts 51b, which do not include the auxiliary grooves 61 and 62, are arranged in the axial direction. However, the present invention is not limited in such a manner. The salient poles 51 may include salient poles provided with the auxiliary grooves 61 and 62 and salient poles free from the auxiliary grooves 61 and 62. Such a structure also obtains advantages similar to that of the structure shown in FIGS. 11 to 13. In such a structure, the auxiliary grooves 61 and 62 are arranged in a balanced manner in the circumferential direction so that the cogging torque (cancellation component) generated at the auxiliary grooves 61 and 62 is suppressed from becoming too large relative to the main component of the cogging torque. Accordingly, the cogging torque generated in the entire motor 1 is decreased in a desirable manner, and the rotation performance of the rotor 3 is further improved.

In the first embodiment, a ratio Fs/F of the axial length Fs of the auxiliary grooves 31 and 32 (axial length of the first opposing part 24a) to the axial length F of the magnet pole portion 24 is set to satisfy Fs/F=0.11. However, the present invention is not limited in such a manner and may be varied to other values in the range of Fs/F<1.

A second embodiment of the present invention will now be described with reference to FIGS. 14A to 19. In the second embodiment, like or same reference numerals are given to those components that are the same as the corresponding components of the first embodiment. Parts differing from the first embodiment will mainly be described below.

In the first embodiment, the auxiliary grooves 31 and 32 are formed to extend over the entire axial length Fs of the first opposing part 24a in each magnet pole portion 24. In the second embodiment, the auxiliary grooves 31 and 32 are formed to extend over the entire axial length of the magnetic pole portion 24. Otherwise, the second embodiment is the same as the first embodiment.

In the second embodiment, the position angle D1 of the auxiliary grooves 31 and 32 are also set to satisfy) D1=M/2+G−a×360(°)/L (where a is a natural number). Accordingly, as shown in FIG. 15A, when a first circumferential end 12x of the distal portion 12a of an arbitrary tooth 12 (tooth 12b at the right end in FIG. 15A) overlaps in the radial direction with a first circumferential end 26x of a core pole portion 26, the side surface 31a of the auxiliary groove 31 in the adjacent magnet pole portion 24 located at the forward side of the core pole portion 26 in the rotation direction overlaps in the radial direction with the first circumferential end 12x of the ath (third in the example of FIG. 15A) tooth 12 (tooth 12c in FIG. 15A) in the circumferential direction (left side in FIG. 15A) from the tooth 12b. In the same manner, as shown in FIG. 15B, when a second circumferential end 12y of the distal portion 12a of an arbitrary tooth 12 (tooth 12d at the left end in FIG. 15A) overlaps in the radial direction with the second end 26y in the circumferential direction of the core pole portion 26, the side surface 32a of the auxiliary groove 32 in the adjacent magnet pole portion 24 at the rearward side of the core pole portion 26 in the rotation direction overlaps in the radial direction with a second circumferential end 12y of the third tooth 12e in the circumferential direction (right side in FIG. 15B) from the tooth 12d.

Figure 16:
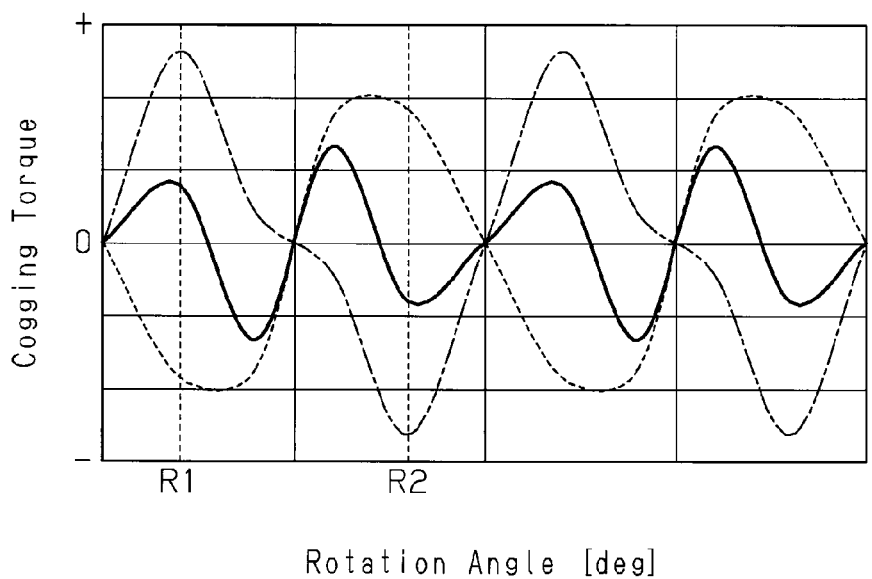
FIG. 16 is a diagram showing the relationship between the rotation angle of the rotor and the cogging torque.

FIG. 16 shows the cogging torque waveform during rotation of the rotor 3 in the second embodiment. The waveform indicated by broken lines in FIG. 16 indicates the waveform of the main component of the cogging torque (cogging torque waveform in a structure in which the auxiliary grooves 31 and 32 are not formed in the magnet pole portion 24). The single-dashed lines indicate the waveform of the cogging torque waveform generated by the auxiliary grooves 31 and 32. The solid line indicates the waveform of the cogging torque generated in the motor 1 of the second embodiment and is obtained by combining the waveform of the main component of the cogging torque (waveform in broken lines) and the cogging torque waveform generated by the auxiliary grooves 31 and 32 (waveform in single-dashed lines).

The rotation angle R1 in FIG. 16 is the rotation angle of the rotor 3 in the state shown in FIG. 15A. At rotation angle R1, the first circumferential end 26$x$ of the core pole portion 26 overlaps in the radial direction with the first circumferential end 12$x$ of the tooth 12$b$. Thus, the magnetic flux easily concentrates at the radially overlapping portion. As a result, the main component of the cogging torque increases toward the negative side. In this case, the side surface 31$a$ of the auxiliary groove 31 overlaps in the radial direction with the first circumferential end 12$x$ of the tooth 12$c$. Thus, the magnetic flux easily concentrates at the radially overlapping portion. As a result, the cogging torque generated by the auxiliary grooves 31 and 32 rises to a positive peak. Accordingly, the main component of the cogging torque and the cogging torque generated by the auxiliary grooves 31 and 32 at the rotation angle R1 cancel each other (refer to the waveform shown by a solid line in FIG. 16), and the cogging torque generated during rotation of the rotor 3 is decreased.

The rotation angle R2 in FIG. 16 is the rotation angle of the rotor 3 in the state shown in FIG. 15B. In the same manner as the rotation angle R1, at the rotation angle R2, the main component of the cogging torque and the cogging torque generated by the auxiliary grooves 31 and 32 cancel each other. Thus, the cogging torque generated during rotation of the rotor 3 is decreased. Further, as shown in FIG. 16, the phase of the main component of the cogging torque is opposite to the phase of the cogging torque generated by the auxiliary grooves 31 and 32 (positive and negative are reversed) irrespective of the rotation angle of the rotor 3. The cogging torque generated by the auxiliary grooves 31 and 32 is the cancellation component for the main component of the cogging torque irrespective of the rotation angle of the rotor 3. Thus, the cogging torque generated in the entire motor 1 is decreased, and the rotation performance of the rotor 3 is improved.

In the second embodiment, an open angle, the center of which lies on the axis C, from the center line Q in the circumferential direction of the magnet pole portion 24 to a circumferential end 24$c$ of the magnet pole portion 24 is represented by A. An open angle from the center line Q of the magnet pole portion 24 to a circumferential end 26$a$ of the core pole portion 26 facing the circumferential end 24$c$ of the magnet pole portion 24 through the void 27 is represented by B (refer to FIG. 14B for both open angles A and B). The torque, the torque ripple, and the cogging torque when the open angle A and the open angle B are varied are respectively shown in FIGS. 17 to 19. In other words, the open angle A extends from the center line Q of the magnet pole portion 24 to the end closer to the magnet pole portion 24 of the void 27. The open angle B extends from the center line Q to the end closer to the core pole portion 26 of the void 27. The open angle A is equal to one half of the open angle M of the magnet pole portion 24 described above, and the open angle B is equal to the angle obtained by adding the open angle G of the void 27 to the open angle A.

Figure 17:
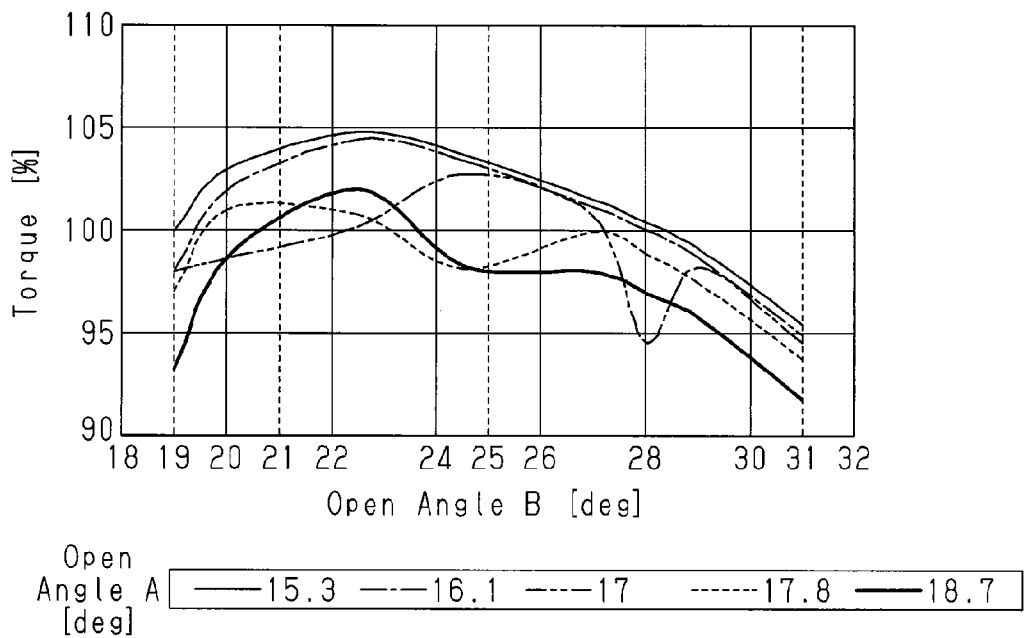
FIG. 17 is a characteristic diagram showing the relationship between open angle A, open angle B, and the torque.

FIG. 17 shows the torque when the open angles A and B are varied. The torque when A=15.3 and B=19 are satisfied is 100%. As apparent from FIG. 17, when the open angle A is in the range of 15.3≤A≤16.1 and the open angle B is in the range of 19.0≤B≤31.0, the torque is relatively stable. Thus, these ranges are satisfactory. Further, when the open angle A is within the range of 15.3≤A≤16.1 and the open angle B is within the range of 21.0≤B≤25.0, the torque increase to a maximum of about 105%. Thus, these ranges are further satisfactory.

Figure 18:
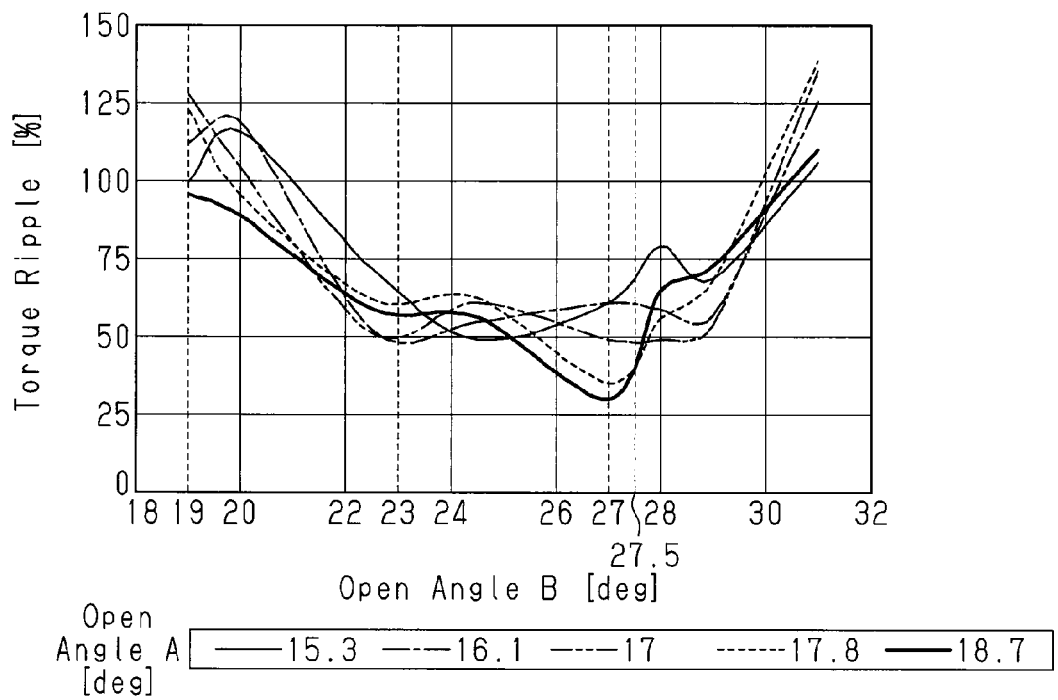
FIG. 18 is a characteristic diagram showing the relationship between open angle A, open angle B, and the torque ripple.

FIG. 18 shows the torque ripple when the open angles A and B are varied. Here, the torque ripple is 100% when A=15.3 is satisfied and B=19 is satisfied. As apparent from FIG. 18, when the open angle A is in the range of 15.3≤A≤18.7 and the open angle B is in the range of 23.0≤B≤27.0, the torque ripple is reduced. Thus, these ranges are satisfactory ranges. Further, when the open angle A is in the range of 17.8≤A≤18.7 and the open angle B is in the range of 26.0≤B≤27.5, torque ripple is further reduced. Thus, these ranges are further satisfactory ranges.

Figure 19:
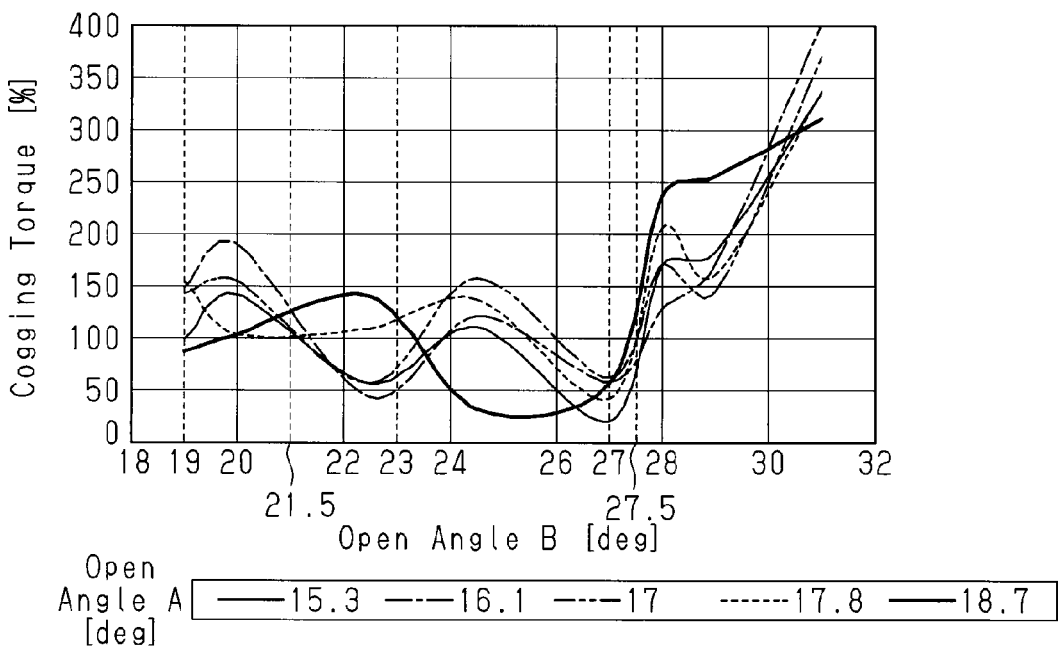
FIG. 19 is a characteristic diagram showing the relationship between open angle A, open angle B, and the cogging torque.

FIG. 19 shows the cogging torque when the open angles A and B are varied. Here, the cogging torque is 100% when A=15.3 and B=19 are satisfied. As apparent from FIG. 19, when the open angle A is in the range of 15.3≤A≤18.7, and the open angle B is in the range of 19.0≤B≤27.5, the cogging torque is relatively stable and low. Thus, these ranges are satisfactory ranges. Further, when the open angle A is in the range of 15.3≤A≤18.7 and the open angle B is in the range of 26.0≤B≤27.0, the cogging torque is decreased to 100% or less. Thus, these ranges are further satisfactory. Moreover, when the open angle A is in the range of 15.3≤A≤17.0 and the open angle B is in the range of 21.5≤B≤23.0, the cogging torque is decreased to 100% or less. These ranges are further satisfactory.

Accordingly, it is desirable that the open angles A and B be set to values in a range in which torque ripple and cogging torque are reduced while the torque is increased and not decreased. Specifically, the torque ripple and the cogging torque are stably reduced while stabilizing the torque by setting the open angle A in the range of 15.3≤A≤18.7 and the open angle B in the range of 23.0≤B≤27.0. Further, the torque ripple and the cogging torque are further reduced while stabilizing the torque by setting the open angle A in the range of 17.8≤A≤18.7 and the open angle B in the range of 26.0≤B≤27.0, respectively.

The second embodiment has the advantages described below.

(4) In the second embodiment, the auxiliary grooves 31 and 32 are formed to extend entirely over each magnet pole portion 24 in the axial direction. In such a structure, the angle D1 satisfies D1=M/2+G−a×360(°)/L (where a is a natural number). This obtains the same advantage as advantage (1).

(5) The same advantage as advantage (2) of the first embodiment is obtained.

(6) The same advantage as advantage (3) of the first embodiment is obtained.

The first and second embodiments may be modified as described below.

In the first and second embodiments, a=3 is satisfied. However, the present invention is not limited in such a manner and a may be a value other than three.

In the first and second embodiments, the two auxiliary grooves 31 and 32 are formed in each magnet pole portion 24. Instead, each magnet pole portion 24 may include just one auxiliary groove.

In the rotor 3 of the first and second embodiments, the shape of the magnets 23 and the shape of the rotor core 22, including the outer circumferential part 25 of the magnet pole portions 24, the core pole portions 26, and the coupling portions 28, may be changed. For instance, a structure that does not include the coupling portions 28 may be employed.

In the first and second embodiments, the magnets 23 function as the N poles and the core pole portions 26 function as the S poles. Instead, the magnets 23 may function as the S poles and the core pole portions 26 may function as the N poles.

In the first and second embodiments, the present invention is applied to the ten-magnetic pole rotor 3 that includes five magnet pole portions 24 and five core pole portions 26. However, the number of magnetic poles of the rotor 3 may be varied, and the number of magnetic poles (number of slots) of the stator 2 may be changed accordingly.

The numerical range for the first and second embodiments may be changed in accordance with the situation or the like.

In the first and second embodiments, the windings of the stator 2 are formed by the segment windings 13. However, the present invention is not limited in such a manner, and continuous wires may be wound around the teeth 12 (refer to FIG. 12).

In the first and second embodiments, the present invention is applied to the inner rotor type motor 1. The present invention may also be applied to an outer rotor type motor.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A motor comprising:
a rotor including a rotor core, a plurality of magnet pole portions arranged along a circumferential direction of the rotor core, and a plurality of core pole portions formed integrally with the rotor core, wherein each of the magnet pole portions is formed by embedding a magnet in the rotor core, each of the core pole portions is arranged between the magnet pole portions that are adjacent to each other in the circumferential direction, and each of the core pole portions is spaced apart from the adjacent one of the magnet pole portions by a void; and
a stator including a plurality of teeth, which are arranged at equal intervals along a circumferential direction and facing toward the rotor in a radial direction, and a plurality of windings, which are arranged on the plurality of teeth;
wherein the magnet pole portions or the core pole portions define first magnetic pole portions, each of the first magnetic pole portions includes a surface, which faces the teeth, and a first opposing part and a second opposing part, which are arranged in an axial direction, the first opposing part includes an auxiliary groove, which has two side surfaces facing toward each other in the circumferential direction, in part of the surface in the circumferential direction, and the second opposing part entirely does not include the auxiliary groove in the surface in the circumferential direction; and
where M(°) represents an open angle of the first magnetic pole portion, G(°) represents an open angle of the void, and L represents the number of teeth, an angle D1 from a center line in the circumferential direction of the first magnetic pole portion to the side surface in the auxiliary groove that is closer to the center line in the circumferential direction satisfies
$D1=M/2+G-a\times 360(°)/L$ (where a is a natural number).

2. The motor according to claim 1, wherein the auxiliary groove is one of two auxiliary grooves arranged in each first magnetic pole portion, and the two auxiliary grooves are arranged in the circumferential direction in symmetry with respect to the center line in the circumferential direction of the corresponding first magnetic pole portion.

3. A motor comprising:
a rotor including a rotor core, a plurality of magnet pole portions arranged along a circumferential direction of the rotor core, and a plurality of core pole portions formed integrally with the rotor core, wherein each of the magnet pole portions is formed by embedding a magnet in the rotor core, each of the core pole portions is arranged between the magnet pole portions that are adjacent to each other in the circumferential direction, and each of the core pole portions is spaced apart from the adjacent one of the magnet pole portions by a void; and
a stator including a plurality of teeth, which are arranged at equal intervals along a circumferential direction and facing toward the rotor in a radial direction, and a plurality of windings, which are arranged on the plurality of teeth;
wherein the magnet pole portions or the core pole portions define first magnetic pole portions, each of the first magnetic pole portions includes a surface, which faces the teeth, a groove-including pole portion and a groove-free pole portion, the groove-including pole portion includes an auxiliary groove, which has two side surfaces facing toward each other in the circumferential direction, and the groove-free pole portion does not include the auxiliary groove in the surface; and
where M(°) represents an open angle of the groove-including pole portion, G(°) represents an open angle of the void, and L represents the number of teeth, an angle D1 from a center line in the circumferential direction of the groove-including pole portion to the side surface in the auxiliary groove that is closer to the center line in the circumferential direction satisfies
$D1=M/2+G-a\times 360(°)/L$ (where a is a natural number).

4. The motor according to claim 3, wherein the auxiliary groove is one of two auxiliary grooves arranged in each groove-including pole portion, and the two auxiliary grooves are arranged in the circumferential direction in symmetry with respect to the center line in the circumferential direction of the corresponding first magnetic pole portion.

5. A motor comprising:
a rotor including a rotor core, a plurality of magnets arranged along a circumferential direction of the rotor core, and a plurality of core pole portions formed integrally with the rotor core, wherein each of the core pole portions is arranged between the magnets that are adjacent to each other in the circumferential direction, and each of the core pole portions is spaced apart from the adjacent one of the magnets by a void; and
a stator including a plurality of teeth, which are arranged at equal intervals along a circumferential direction and facing toward the rotor in a radial direction, and a plurality of windings, which are arranged on the plurality of teeth;
wherein each of the core pole portions includes a surface, which faces the teeth, and a first opposing part and a second opposing part, which are arranged in an axial direction, the first opposing part includes an auxiliary groove, which has two side surfaces facing toward each other in the circumferential direction, in part of the surface in the circumferential direction, and the second opposing part entirely does not include the auxiliary groove in the surface in the circumferential direction; and where T(°) represents an open angle of a distal portion of each of the teeth, and R(°) represents an open angle of the core pole portion, an angle D2 from a center line in the circumferential direction of the core pole portion to the side surface in the auxiliary groove that is closer to the center line satisfies

D2=T−R/2.

6. The motor according to claim 5, wherein the auxiliary groove is one of two auxiliary grooves arranged in each core pole portion, and the two auxiliary grooves are arranged in the circumferential direction in symmetry with respect to the center line in the circumferential direction of the core pole portion.

7. A motor comprising:
a rotor including a rotor core, a plurality of magnets arranged along a circumferential direction of the rotor core, and a plurality of core pole portions formed integrally with the rotor core, wherein each of the core pole portions is arranged between the magnets that are adjacent to each other in the circumferential direction, and each of the core pole portions is spaced apart from the adjacent one of the magnets by a void; and
a stator including a plurality of teeth, which are arranged at equal intervals along a circumferential direction and facing toward the rotor in a radial direction, and a plurality of windings, which are arranged on the plurality of teeth;
wherein each of the core pole portions includes a surface, which faces the teeth, a groove-including core pole portion and a groove-free core pole portion, the groove-including core pole portion includes an auxiliary groove, which has two side surfaces facing toward each other in the circumferential direction in the surface and the groove-free core pole portion entirely does not include the auxiliary groove in the surface; and
where T(°) represents an open angle of a distal portion of each of the teeth, and R(°) represents an open angle of the core pole portion, an angle D2 from a center line in the circumferential direction of the core pole portion to the side surface in the auxiliary groove that is closer to the center line satisfies

D2=T−R/2.

8. The motor according to claim 7, wherein the auxiliary groove is one of two auxiliary grooves arranged in each core pole portion, and the two auxiliary grooves are arranged in the circumferential direction in symmetry with respect to the center line in the circumferential direction of the core pole portion.

9. A motor comprising:
a rotor including a rotor core, a plurality of magnet pole portions arranged along a circumferential direction of the rotor core, and a plurality of core pole portions formed on the rotor core, wherein each of the magnet pole portions is formed by embedding a magnet in the rotor core, each of the core pole portions is arranged between the magnet pole portions that are adjacent to each other in the circumferential direction, each of the core pole portions is spaced apart from the adjacent one of the magnet pole portions by a void, and the voids have the same area when viewed in an axial direction; and
a stator including a plurality of teeth, which are arranged at equal intervals along a circumferential direction and facing toward the rotor in a radial direction, and a plurality of windings, which are arranged on the plurality of teeth;
wherein each of the magnet pole portions includes a surface, which faces the teeth, and an auxiliary groove, which has two side surfaces facing toward each other in the circumferential direction; and
where M(°) represents an open angle of the magnet pole portion, G(°) represents an open angle of the void, and L represents the number of teeth, an angle D1 from a center line in the circumferential direction of the magnet pole portion to the side surface in the auxiliary groove that is closer to the center line in the circumferential direction satisfies D1=M/2+G−a×360(°)/L (where a is a natural number).

* * * * *